US008913037B1

(12) United States Patent
Liu et al.

(10) Patent No.: US 8,913,037 B1
(45) Date of Patent: Dec. 16, 2014

(54) GESTURE RECOGNITION FROM DEPTH AND DISTORTION ANALYSIS

(71) Applicant: Rawles LLC, Wilmington, DE (US)

(72) Inventors: Qiang Liu, Cupertino, CA (US); Samuel Henry Chang, San Jose, CA (US)

(73) Assignee: Rawles LLC, Wilmington, DE (US)

( * ) Notice: Subject to any disclaimer, the term of this patent is extended or adjusted under 35 U.S.C. 154(b) by 249 days.

(21) Appl. No.: 13/648,088

(22) Filed: Oct. 9, 2012

(51) Int. Cl.
*G06F 3/042* (2006.01)
*G06F 3/01* (2006.01)

(52) U.S. Cl.
CPC .............. *G06F 3/0425* (2013.01); *G06F 3/017* (2013.01)
USPC .......................................................... 345/175

(58) Field of Classification Search
None
See application file for complete search history.

(56) References Cited

U.S. PATENT DOCUMENTS

| 8,693,731 | B2* | 4/2014 | Holz et al. ..................... 382/103 |
| 2012/0223885 | A1 | 9/2012 | Perez |
| 2013/0057515 | A1* | 3/2013 | Wilson .......................... 345/175 |
| 2013/0257751 | A1* | 10/2013 | Stafford ........................ 345/173 |

FOREIGN PATENT DOCUMENTS

WO WO2011088053 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Joseph Haley
(74) *Attorney, Agent, or Firm* — Lee & Hayes, PLLC

(57) ABSTRACT

Systems and techniques for detecting gestures of a user based on analysis of acquired depth maps as well as identified distortion within one or more acquired color images. For instance, a system may project content onto a display surface within an environment. A user may then interact with the content via gestures, which may include hand gestures, gestures with a stylus or the like. In some instances, the content includes multiple selection portions, such as soft buttons, icons, and the like, that a user may select by pointing or touching with a finger or other type of selection tool. For instance, the projected content may include one or more projected icons and the user may select one of the icons by touching the display surface onto which the respective display icon is being projected.

18 Claims, 4 Drawing Sheets

GESTURE RECOGNITION FROM DEPTH AND DISTORTION ANALYSIS

BACKGROUND

A large and growing population of people is enjoying entertainment through consumption of digital content items, such as music, movies, images, books and so on. Many people today consume digital content through a wide variety of electronic devices. Among these electronic devices are cellular telephones, personal digital assistants (PDAs), electronic book readers, portable media players, tablets, netbooks and the like. Devices such as this traditionally rely on input mechanisms such as keyboards, which require physical manipulation by a user. Increasingly, however, it is desired to detect and monitor the physical positions and movements of users and objects within an environment, and to respond to gestures and other actions of a user without dedicated physical input devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
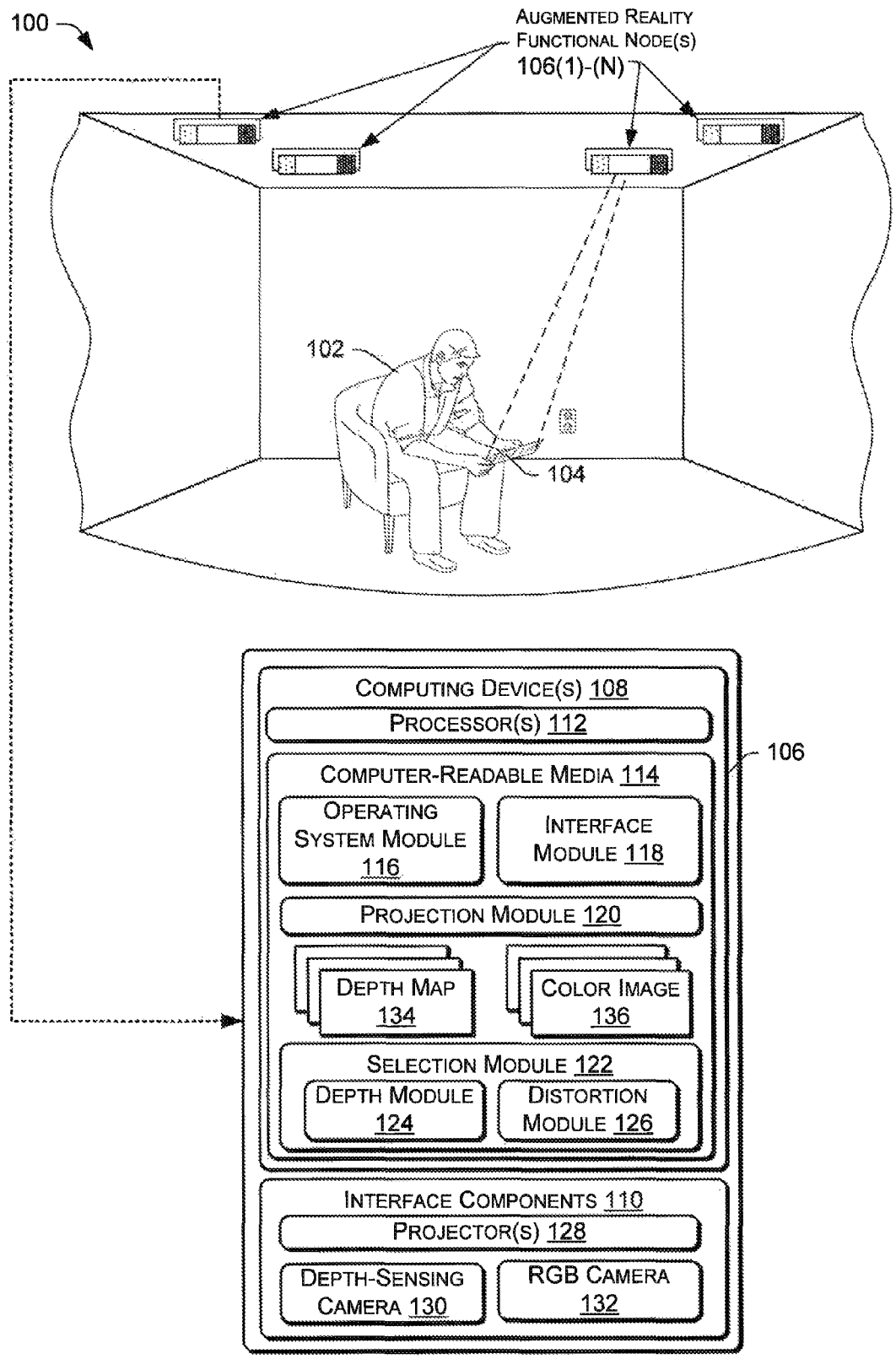
FIG. 1 illustrates an environment that includes an augmented reality functional node (ARFN) that projects content onto a display surface and that detects a user's selection of a portion of the content based on both analyzing depth maps acquired by a depth-sensing camera and identifying distortion between color images acquired by a red-green-blue (RGB) camera.

This disclosure describes systems and techniques for detecting gestures of a user based on analysis of acquired depth maps as well as identified distortion within one or more acquired color images. For instance, a system may project content onto a display surface within an environment. A user may then interact with the content via gestures, which may include hand gestures, gestures with a stylus or the like. In some instances, the content includes multiple selection portions, such as soft buttons, icons, links and the like, that a user may select by pointing or touching with a finger or other selection tool. For instance, the projected content may include one or more projected icons and the user may select one of the icons by touching the portion of the display surface onto which the respective display icon is being projected.

In addition to a projector to project the content, the system may also include one or more cameras to generate depth information of objects within an environment. For instance, the system may include a camera to generate depth maps of the environment, with the depth maps representing corresponding depths of different objects within the environment. For instance, the system may include a depth-sensing camera to generate one or more depth maps based on, for instance, time-of-flight (ToF) values associated with objects within an illuminated portion of an environment. In addition, the system may include a camera to acquire color images of the environment. For instance, the system may include a red-green-blue (RGB) camera to acquire one or more color images of at least a portion of the environment. After projecting the content onto the display surface, the RGB camera may acquire an image of the display surface including the projected content.

The system may then receive the depth maps generated by the depth-sensing camera and may analyze the depth maps to attempt to locate a selection tool, such as a finger, stylus or the like within each respective depth map. Upon locating a selection tool, the system may analyze the depth maps to determine a distance between the selection tool and the display surface.

Given that the resolution of the RGB camera may be greater than the resolution of the depth-sensing camera, the system may analyze the color images acquired by the RGB camera upon determining that the selection tool is touching or is within a threshold distance of the display surface. That is, in order to detect a user's selection of a selectable element within the projected content, the system may begin by analyzing the depth maps and, upon determining that the selection tool is near or touching the surface, may analyze the images acquired by the higher-resolution RGB camera to identify the user's selection.

As described below, after determining that the selection tool is touching or within the threshold distance of the display surface, the system may identify distortion within a color image acquired by the RGB camera to determine the user's selection. To do so, the system may compare the image initially acquired by the camera to the image acquired after the selection tool touched or was within the threshold distance of the display surface. By comparing these images, the system may identify the distortion caused by the selection tool (e.g., the user's finger and hand) residing between the projector and the display surface. That is, the system may identify changes in the image as projected, with these changes (or "distortion") being caused by the projector now projecting at least a portion of the image onto the selection tool rather than the initial projection surface.

In another example, the system may compare a color image captured after the selection tool is near or touching the surface to a reference image that the system initially projected. That is, rather than comparing a first color image captured by a camera to a second color image captured by the camera, the system may compare a color image captured by a camera to the image stored in memory of the system and initially projected by the system.

In either instance, after identifying the portion of the image distorted by the selection tool, the system may then determine which portion of the content the selection tool is over (e.g., which selectable element the user is selecting). In one implementation, the system may identify the area of the projected image corresponding to the distal end of the distorted portion of the image. In these instances, the distal portion of the distortion corresponds to the end of the selection tool and, therefore, the area corresponding to the distal end of the distortion may be mapped to a particular selectable element of the content.

In another example, the system may have been trained with multiple distortion patterns corresponding to respective selections. For instance, each of multiple distortion patterns may be associated with a particular selectable element for a particular piece of projected content. Therefore, when the system identifies the distortion within a particular color image, the system may compare the distortion to the different distortion patterns to identify a closest match. Upon identifying the closest match, the system may then determine the selectable element corresponding to the closest-matching distortion pattern.

To provide an example, a projector may project a keypad onto a display surface (e.g., a hand of a user, a table, a wall) for the purpose of allowing the user to make a phone call. After the projector projects the keypad, an RGB camera may acquire a color image of the display surface including the projected keypad to be used later as a reference image for identifying distortion. A depth-sensing camera may then generate depth maps, which the system may analyze to determine when a selection tool, such as a finger of the user, approaches the display surface onto which the keypad is projected.

Upon determining that the selection tool is touching the display surface or is within a threshold distance, the system may analyze a color image of the display surface that is partially distorted due to the presence of the user's finger and hand between the projector and the display surface. The system may then compare this color image to the initially acquired image to identify the distorted portion of the image. The system may then analyze the distortion to determine which key of the keypad the user's finger is selecting. For instance, the system may identify the distal portion of the distortion and may map this to a particular key, or may compare the distortion to multiple distortion patterns associated with particular key selections. In either instance, the system may perform an action corresponding to the user's selection. For instance, the system may enter the particular key into a text field or the like.

By utilizing both a depth-sensing camera and an RGB camera to determine a user's selection within projected content, the systems and techniques described below are able to utilize depth maps having a relatively coarse resolution to determine when a selection tool is near a display surface and, thereafter, utilize higher-resolution color images to precisely identify a user's selection.

FIG. 1 illustrates an example environment 100 in which a user 102 consumes content that is projected by one or more augmented reality functional nodes (ARFNs) 106(1), . . . , 106(N) (collectively referred to as "the ARFN 106" in some instances) onto a display surface 104. In the illustrated example, the display surface 104 comprises a passive or non-powered handheld display medium. It is to be appreciated that the techniques described herein may be performed by a single ARFN, by a collection of any number of ARFNs, or by any other devices or combinations of devices. Furthermore, while FIG. 1 illustrates the display surface 104 as the non-powered medium, in other instances the display surface 104 may comprise a hand of the user, a table, a wall, a ceiling or the like.

The projected content may include any sort of multimedia content, such as text, color images or videos or any other visual content. In some cases, the projected content may include interactive content such as menus and controls and may include multiple selectable portions, such as icons, keys, buttons, links or the like.

Each ARFN 106 may include one or more computing devices 108, as well as one or more interface components 110. The computing devices 108 and interface components 110 may be configured in conjunction with each other to interact with the user 102 within the environment 100. In particular, the ARFN 106 may be configured to project content onto the display surface 104 for viewing by the user 102, and to accept commands from the user 102 in the form of hand gestures or other actions.

The computing device 108 of the example ARFN 106 may include one or more processors 112 and computer-readable media 114. The processor(s) 112 may be configured to execute instructions, which may be stored in the computer-readable media 114 or in other computer-readable media accessible to the processor(s) 112. The processor(s) 112 may include digital signal processors (DSPs), which may be used to process audio signals and/or video signals.

The computer-readable media 114, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device 108. The computer-readable media 114 may reside within a housing of the ARFN, on one or more storage devices accessible on a local network, on cloud storage accessible via a wide area network, or in any other accessible location.

The computer-readable media 114 may store various modules, such as instructions, datastores, and so forth, which are configured to execute on the processor(s) 112. For instance, the computer-readable media 114 may store an operating system module 116 and an interface module 118. The operating system module 116 may be configured to manage hardware and services within and coupled to the computing device 108 for the benefit of other modules. The interface module 118 may be configured to receive and interpret commands received from users within the environment 100, and to respond to such commands in various ways as determined by the particular environment.

The computer-readable media 114 may further include a content projection module 120 and a selection module 122. The projection module 120 is executable to project content onto the display surface 104. The projection module 120 may receive the position of the display surface 104, and may manipulate the projected content so that it appears correctly on the display surface 104. For example, the projection module 120 may vary the size, location, orientation and aspect ratio of a projected image. The selection module, meanwhile, may be executable to identify a user's selection within the projected content with use of a depth module 124 and a distortion module 126, described below.

In addition, the ARFN 106 may include various interface components 110, such as user interface components and other components that may be used to detect and evaluate conditions and events within the environment 100. As examples, the interface components 110 may include one or more projectors 128, a depth-sensing camera 130 and an RGB camera 132, as described below. The interface components 110 may in certain implementations include various other types of sensors and transducers, content generation devices, and so forth, including microphones, speakers, range sensors, three-dimensional mapping sensors, and other devices.

The coupling between the computing device 108 and the interface components 110 may be via wire, fiber optic cable, wireless connection, or the like. Furthermore, while FIG. 1 illustrates the computing device 108 as residing within a housing of the ARFN 106, some or all of the components of the computing device 108 may reside at another location that is operatively connected to the ARFN 106. In still other instances, certain components, logic, and/or the like of the computing device 108 may reside within a projector or camera. Therefore, it is to be appreciated that the illustration of the ARFN 106 of FIG. 1 is for illustrative purposes only, and that components of the ARFN 106 may be configured in any other combination and at any other location.

Furthermore, additional resources external to the ARFN 106 may be accessed, such as resources in another ARFN 106 accessible via a local area network, cloud resources accessible via a wide area network connection, or a combination thereof. In still other instances, the ARFN 106 may couple to and control other devices within the environment, such as televisions, stereo systems, lights, and the like.

The projector(s) 128 may be used to project content onto the display surface 104 for viewing by the user 102. In addition, the projector(s) 128 may project patterns, such as non-visible infrared patterns, that can be detected by the depth-sensing camera 130 and used for 3D reconstruction and modeling of the environment 100. The projector 128 may comprise a microlaser projector, a digital light projector (DLP), cathode ray tube (CRT) projector, liquid crystal display (LCD) projector, light emitting diode (LED) projector or the like. The projector may have rotate, pan, and zoom capabilities, implemented electronically or mechanically.

The depth-sensing camera 130 may be configured to generate one or more depth maps 134 of the environment using an array of techniques. For instance, the depth-sensing camera 130 may create the depth maps 134 using structured light analysis, time-of-flight observations or the like. For instance, a projector or another light source may illuminate at least a portion of the environment and the camera 130 may comprise a time-of-flight (ToF) sensor to capture light reflected by the environment and calculate corresponding ToF values. These ToF values may then be used to calculate distances of objects within the environment. The RGB camera 132, meanwhile, may acquire one or more color images 136 of the environment.

The selection module 122 may utilize the depth maps 134 and the color images 136 to identify gestures made by the user 102 with regard to the projected content. For instance, the selection module 122 may recognize when the user selects a selectable element of the projected content, such as an icon, link, button or the like.

To identify a selection, the distortion module 126 of the selection module 122 may initially receive and store a color image of the display surface with the content projected thereon (i.e., an image that is not distorted by a selection tool). The depth module 124 of the selection module 122 may then analyze the depth maps 134 to determine when a selection tool, such as a finger of the user, touches or is within a threshold distance of the display surface. When the depth module 124 makes this determination, the distortion module 126 receives a color image acquired at the time when or after the selection tool touches or is within the threshold distance of the display surface. The distortion module 126 then compares this image to the initially received image to identify the distortion caused by the selection tool residing between the projector 128 and the display surface 104.

After identifying the distortion, the distortion module 126 analyzes the distortion to determine the gesture of the user 102. For instance, the distortion module 126 analyzes the distortion to determine which selectable element the user 102 is selecting. In one example, the distortion module 126 identifies the distal end of the distortion corresponding to the distal end of the selection tool (e.g., the distal end of the user's finger). The module 126 then determines what selectable element corresponds to this area of the projected content. In another example, the distortion module 126 compares the distortion to multiple distortion patterns that have been previously associated with user selections for the particular projected content. Upon identifying the closest match, the module 126 identifies the selectable element corresponding to the closest-matching distortion pattern.

Figure 2:
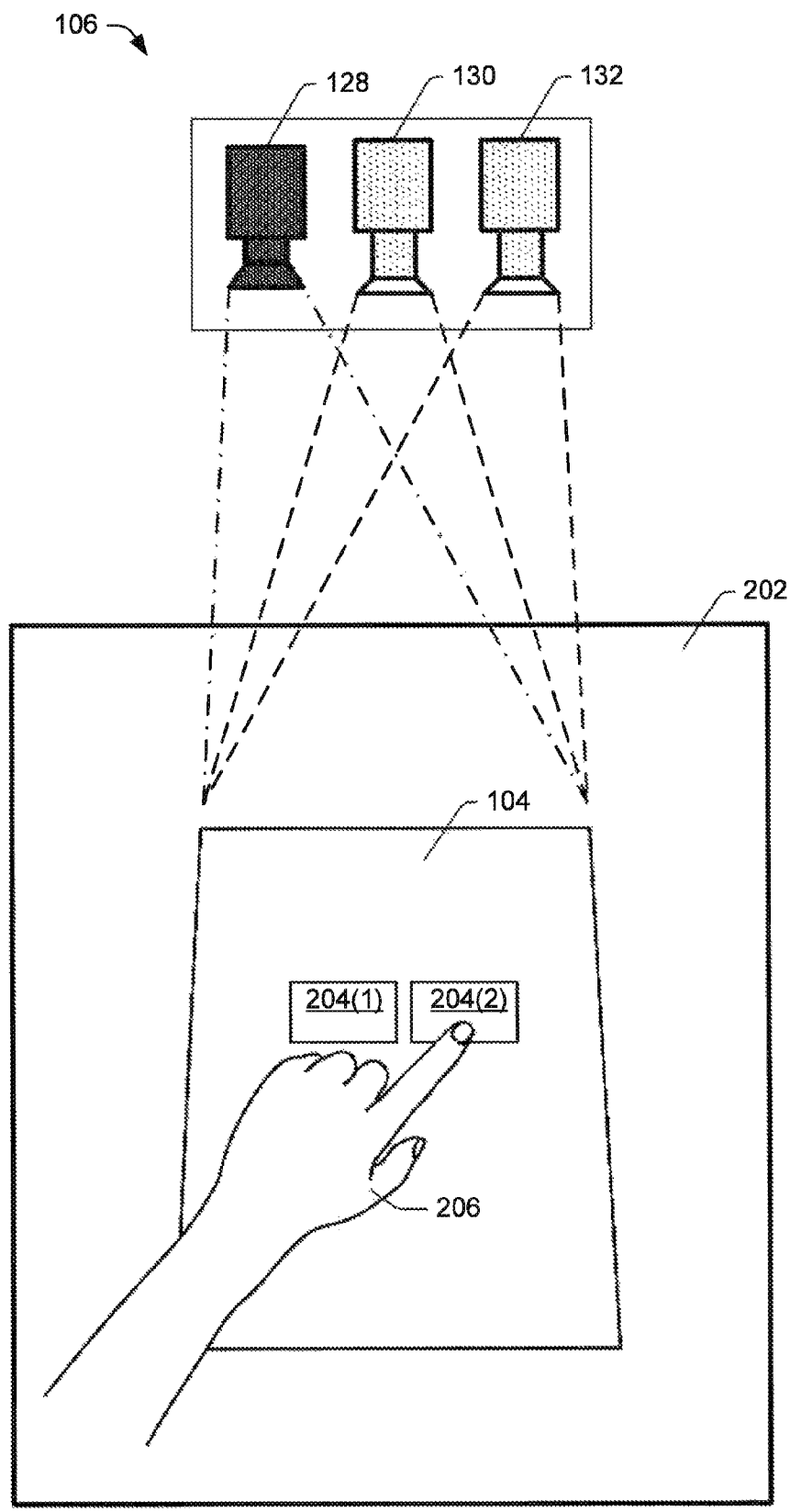
FIG. 2 is a top view of a scene that may be observed by the ARFN to detect user hand gestures based on acquired depth maps and acquired color images.

FIG. 2 is a top view of a scene 202 that may be observed by the ARFN 106 to detect user hand gestures based on acquired depth maps and acquired color images. In this example, the projector 128 projects content onto the display surface 104, with this content including two example selectable elements 204(1) and 204(2), which may comprise links, soft buttons, icons or the like. The content may also include images, text and/or any other type of visual content. In addition, the depth-sensing camera 130 may generate one or more depth maps of the scene 202 while the RGB camera may acquire one or more color images of the scene 202.

As illustrated, a hand 206 of the user is attempting to select the selectable element 204(2). In order to identify this selection, the ARFN 106 may have initially captured, via the RGB camera 132, a reference image of the content as projected onto the display surface 104 (e.g., undistorted by the hand 206 of the user). The ARFN 106 may also analyze the depth maps generated by the depth-sensing camera 130 to determine when the hand and/or finger of the user touches or is within a threshold distance of the display surface 104.

When the hand 206 is touching or within the threshold distance, the ARFN 106 may analyze a color image of the content as projected onto the display surface while the hand or finger of the user is touching or within the threshold distance. The ARFN 106 may then compare this image to the initial image to identify distortion caused by the hand 206. In this example, the wrist, hand and finger of the user will cause distortion in the color image given that these parts reside between the projector and the display surface 104. As described above, the ARFN 106 may then determine, from the distortion in the color image, that the user is selecting selectable element 204(2). The ARFN 106 may then perform an action corresponding to this selection upon identifying the selection (e.g., turning a page, adding an item to a cart, etc.).

Figure 3:
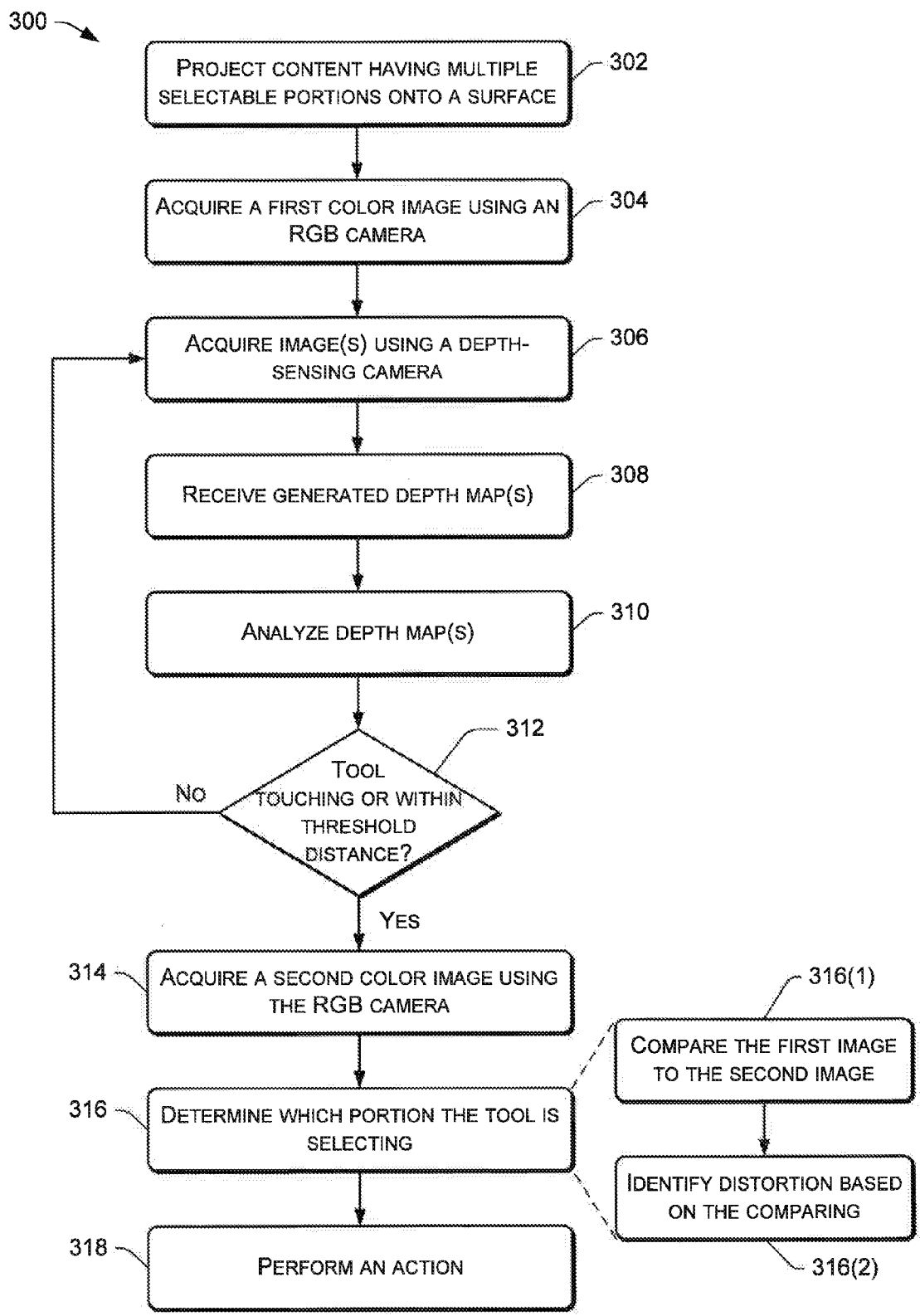
FIG. 3 is an example flow diagram of a process for determining a portion of projected content that a user selects based on analyzing acquired depth maps and identifying distortion in acquired color images.

FIG. 3 is an example flow diagram of a process 300 for determining a portion of projected content that a user selects based on analyzing acquired depth maps and identifying distortion in acquired color images. Each process described herein is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 302, the process 300 projects content having multiple selectable elements onto a display surface. At 304, the process 300 acquires a first color image of the display surface using an RGB camera. At 306, the process 300 acquires images using a depth-sensing camera and, at 308, receives depth maps generated based on the acquired images. At 310, the process 300 analyzes the depth maps to determine a location of a selection tool relative to the display surface. The operation 310 may comprise a series of sub-operations, as described below with reference to FIG. 4.

At 312, the process 300 queries whether the selection tool is touching or within a threshold distance of the display surface. If not, then the process 300 returns to acquiring images using the depth-sensing camera at 306. If so, however, then at 314 the process 300 acquires a second color image using the RGB camera. At 316, the process 300 then determines which portion of the content the selection tool is selecting based at least in part on the distortion within the second color image as projected onto the display surface and the selection tool. The operation 316 may comprise sub-operations 316(1) and 316(2). At 316(1), the process 300 compares the first color image to the second image and, at 316(2), identifies distortion within the second color image based on this comparison. At 318, the process performs an action corresponding to the selection.

Figure 4:
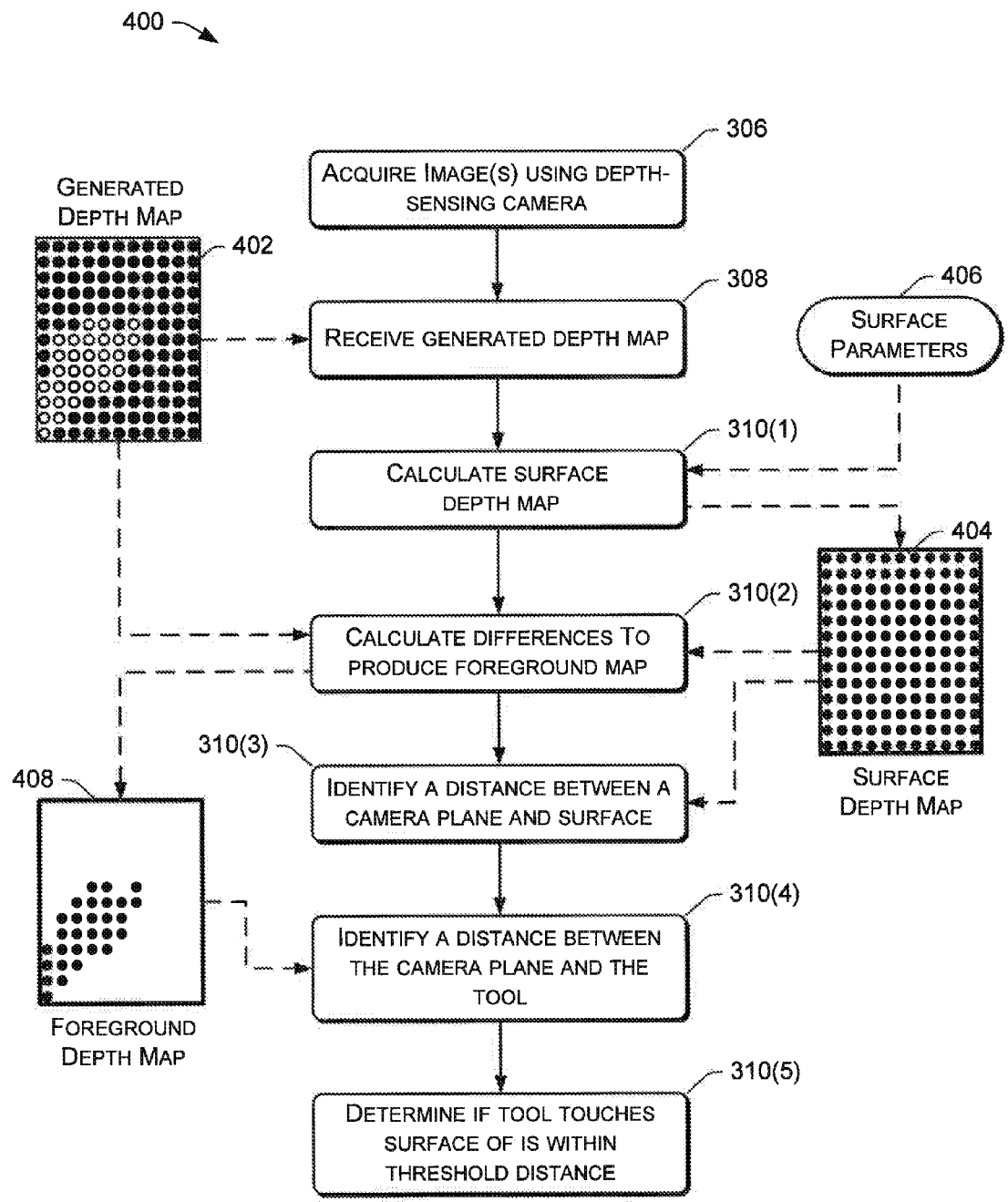
FIG. 4 is an example flow diagram of a process for determining when a selection tool touches or is within a threshold distance of a display surface based on analyzing an acquired depth map.

FIG. 4 is an example flow diagram of a process 400 for determining when a selection tool touches or is within a threshold distance of a display surface based on analyzing an acquired depth map. At 306, the process 400 acquires images using a depth-sensing camera as described above with reference to FIG. 3.

At 308, the process 400 receives one or more generated depth maps, such as an example depth map 402. The depth map 402 may be constructed using various techniques, depending on the available sensors of the ARFN 106. For example, structured light analysis may be used to construct a depth map of an area corresponding to the display surface. When using structured light analysis, the projector(s) 128 may be used to project a light pattern onto the scene, and the depth-sensing camera 130, offset laterally from the projector(s) 128, may be used to capture images of the reflected light pattern. Distortions in the reflected light pattern may be analyzed to determine the depths of individual points within the observed scene. In certain embodiments, the depth of an individual point may correspond to its distance from a reference plane, such as the plane of the camera 130.

Other 3D analysis techniques or devices may alternatively be used to produce the depth map 402, including various 3D imaging devices using optical techniques, audio/sonic techniques, and so forth. In some embodiments, time-of-flight observations may be used to determine the depth map 402.

The depth map 402, as well as other depth maps described herein, may comprise a three-dimensional image or point cloud, in which surface points of objects are specified in terms of their three-dimensional coordinates. For example, each point may be associated with X, Y, and Z coordinates. In FIG. 4, the depth map 402 is represented as a two-dimensional array of dots or circles, each of which is associated with a depth (not shown) as its third dimension. Thus, each point may be thought of as having X and Y coordinates corresponding to its position within the two-dimensional array, as well as a Z or depth coordinate that is not represented in FIG. 4. Note that each point of the depth map 402 corresponds to a point on an observed surface, such as the display surface or the selection tool (e.g., the user's finger).

Solid dots in FIG. 4 represent points of the display surface that have not been occluded, and that have therefore been directly observed when forming the depth map 402. Empty circles represent points over the display surface have been occluded, such as by the hand of the user. This distinction between occluded and non-occluded points is shown in FIG. 4 solely for purposes of explanation. The generated depth map itself does not indicate any distinction between points of the display surface and points of an occluding foreground object. Rather, each point of the depth map 402 is represented simply by its spatial coordinates, including depth, relative to an observation point.

At 310(1), the process 400 calculates a depth map 404 corresponding to the surface on which the content is being projected. In some instances, the process 400 may determine the surface depth map 404 using both the generated depth map 402 and one or more surface parameters 406. These parameters 406 may comprise the 2D or 3D coordinates of the corners of the display surface. Alternatively, the surface parameters 406 may comprise the 2D or 3D coordinates of the center of the display surface, along with the dimensions and orientation of the display surface. The surface parameters 406 may take different forms depending on the known or expected shape of the display surface. Note that the display surface may be non-planar. For example, the display surface may be curved or spherical.

The surface depth map 404 may be generated based on the location, position, orientation, and/or 3D pose of the display surface as specified by the surface parameters 406, in light of the known shape of the display surface. In certain embodiments, the shape of the display surface may be represented or defined by one or more parameterized expressions or equations. The calculated surface depth map 404 corresponds in size, position, and orientation to the actual display surface that has been detected within the observed scene, and includes depths of points that have been obscured by the user's hand in the observed scene. Specifically, the surface depth map 404 indicates the calculated depths of an array of points across the display surface, at any desired density of points, and includes depths for points that have not been directly observed. The surface depth map 404 may be calculated at a point density equal to the point density of the depth map 402, so that each point of the calculated surface depth map 404 corresponds to a respective point of the depth map 402.

After generating a surface depth map 404, the process 400 may calculate differences between the depth map 402 and the surface depth map 404 to produce, at 310(2), a foreground depth map 408. The foreground depth map 408 may include points corresponding to a selection tool, such as a finger of the user, a stylus or the like.

The foreground depth map 408 may indicate differences in depth between the points indicated by the depth map 402 and the respective points indicated by the calculated surface depth map 404. A particular point of the foreground depth map 408 is calculated by taking the difference of the corresponding point of the depth map 402 and the corresponding point of the calculated surface depth map 404. More specifically, an individual point of the foreground depth map 408 may be calculated by subtracting the depth of the corresponding point of the calculated surface depth map 404 from the depth of the corresponding point of the depth map 402.

As a result of the operation 310(2), points corresponding to the hand or finger of a user overlaying the display surface are represented in the foreground depth map 408 as positive or non-zero depth values, corresponding to distances from the display surface. Points having values of zero or nearly zero correspond to points of the display surface itself. The representation in FIG. 4 of the foreground depth map 408 indicates those points having non-zero values, which correspond to the hand of the user.

The described techniques allow points corresponding to a foreground object such as a hand to be identified or isolated, in a process that also yields a depth map of the foreground object. The foreground depth map 408 may be analyzed to determine properties of the hand. For example, the foreground depth map 408 may be analyzed to determine whether there is a foreground object in the scene corresponding to selection tool, such as a human hand, a stylus, a pen or the like. More detailed analysis may be performed to determine the specific shape, configuration, or gesture of the hand. Furthermore, the actions of FIG. 4 may be performed repetitively to identify or record hand actions, motions, gestures, and so forth.

At 310(3), the process 400 then identifies a distance between a plane of the depth-sensing camera 130 and the display surface using the surface depth map 404. At 310(4), the process 400 identifies a distance between the plane of the camera and the selection tool using the foreground depth map 408. Finally, at 310(5), the process 400 determines if the selection tool touches or is within a threshold distance of the display surface by determining a difference between the identified distances.

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:

1. An apparatus comprising;
a time-of-flight (ToF) sensor configured to receive light from an illuminated portion of an environment and determine a ToF value associated with one or more objects in the illuminated portion of the environment;
an image sensor configured to capture color images of at least a portion of the environment;
a projector configured to project content onto a display surface within the environment, at least a portion of the content having multiple selectable elements;
a processor; and
computer-readable media storing computer-executable instructions that, when executed by the processor, cause the processor to perform acts comprising:
computing depth information associated with the one or more objects based at least in part on the ToF value;
determining, from the depth information, when a hand or finger of a user touches or is within a threshold distance of the display surface; and
upon determining that the hand or finger of the user touches or is within the threshold distance, determining which element of the multiple selectable elements the hand or finger of the user has selected, the determining including identifying changes between a first of the color images captured prior to the hand or finger touching or being within the threshold distance and a second of the color images captured after the hand or finger touches or is within the threshold distance.

2. An apparatus as recited in claim 1, wherein the display surface comprises a palm of the user.

3. An apparatus as recited in claim 1, wherein determining which element the hand or finger of the user has selected comprises:
comparing the changes to multiple pre-stored distortion patterns;
selecting a particular distortion pattern that most closely matches the changes based at least in part on the comparing; and
mapping the particular distortion pattern to the selected element.

4. An apparatus as recited in claim 1, wherein each of the multiple selectable elements are associated with a respective area in the color images, and determining which element the hand or finger of the user has selected comprises:
identifying areas in the color image that have been distorted by the selection hand or finger of the user;
determining, from the areas that have been distorted, an area corresponding to a distal end of the hand or finger of the user; and
mapping the area corresponding to the distal end of the hand or finger of the user to the selected element.

5. A non-transitory computer-readable media storing computer-executable instructions that, when executed by a processor, cause the processor to perform acts comprising:
analyzing depth information to determine when a selection tool touches or is within a threshold distance of a surface on which content is projected;
acquiring a color image after the selection tool touches or is within the threshold distance of the surface;
comparing the color image acquired after the selection tool touches or is within the threshold distance of the surface to a color image of the surface acquired prior to the selection tool touching or being within the threshold distance of the surface;
identifying a distortion in the color image acquired after the selection tool touches or is within the threshold distance of the surface based at least in part on the comparing; and
determining which portion of the content the selection tool is selecting based at least in part on the distortion.

6. The computer-readable media as recited in claim 5, wherein the selection tool resides between the surface and a projector that projects the content when the selection tool is within the threshold distance, and the distortion is caused at least in part by the selection tool.

7. The computer-readable media as recited in claim 5, wherein the surface comprises a palm of a user and the selection tool comprises a finger of the user.

8. The computer-readable media as recited in claim 5, wherein the surface comprises a palm of a user in the environment, a display medium held by the user, a table in the environment, a wall in the environment, or a ceiling in the environment.

9. The computer-readable media as recited in claim 5, the acts further comprising performing an action corresponding to the selected portion of the content at least partly in response to the determining.

10. The computer-readable media as recited in claim 5, wherein the determining comprises comparing the distortion to multiple pre-stored distortion patterns.

11. The computer-readable media as recited in claim 5, wherein the determining comprises identifying a distal portion of the distortion corresponding to the selection tool and mapping the distal portion of the distortion to the portion of the content that the selection tool is selecting.

12. The computer-readable media as recited in claim 5, wherein the depth information is generated by a depth-sensing camera and the color images are generated by an RGB camera.

13. The computer-readable media as recited in claim 5, wherein the content comprises a graphical user interface (GUI) having multiple soft buttons, and the selected portion comprises one of the multiple soft buttons.

14. The computer-readable media as recited in claim 5, the wherein the analyzing comprises:
   identifying, from the depth information: (i) a distance between a plane of a camera that acquires images and the surface, and (ii) a distance between the plane of the camera and the selection tool; and
   determining when selection tool touches or is within the threshold distance of the surface based at least in part between a difference between the distances.

15. A method comprising:
   under control of one or more computing systems configured with executable instructions,
      analyzing information acquired by a first camera to determine that a hand or finger of a user touches or is within a threshold distance of a surface on which content is projected; and
      analyzing information acquired by a second camera to identify a gesture of the hand or finger, the second camera being configured to generate one or more color images, and the analyzing the information acquired by the second camera comprising identifying distortion in a first of the one or more color images by comparing the first color image with a second of the one or more color images or a pre-stored image associated with the projected content.

16. A method as recited in claim 15, wherein identifying the gesture comprises determining which element of multiple selectable elements within the content the hand or finger is selecting.

17. A method as recited in claim 15, wherein identifying the gesture comprises determining where the hand or finger is located relative to the content or the surface.

18. A method as recited in claim 15, wherein the first camera is configured to generate one or more depth maps, and the analyzing the information acquired by the first camera comprises analyzing the one or more depth maps to determine when the hand or finger touches or is within the threshold distance of the surface.

\* \* \* \* \*